March 17, 1953 — W. E. FORD ET AL — 2,631,451
WATER METER TESTER
Filed May 29, 1950 — 2 SHEETS—SHEET 1

INVENTOR.
WILBUR E. FORD and
HOWARD NIEMEYER,
BY: Harold B. Hood
ATTORNEY.

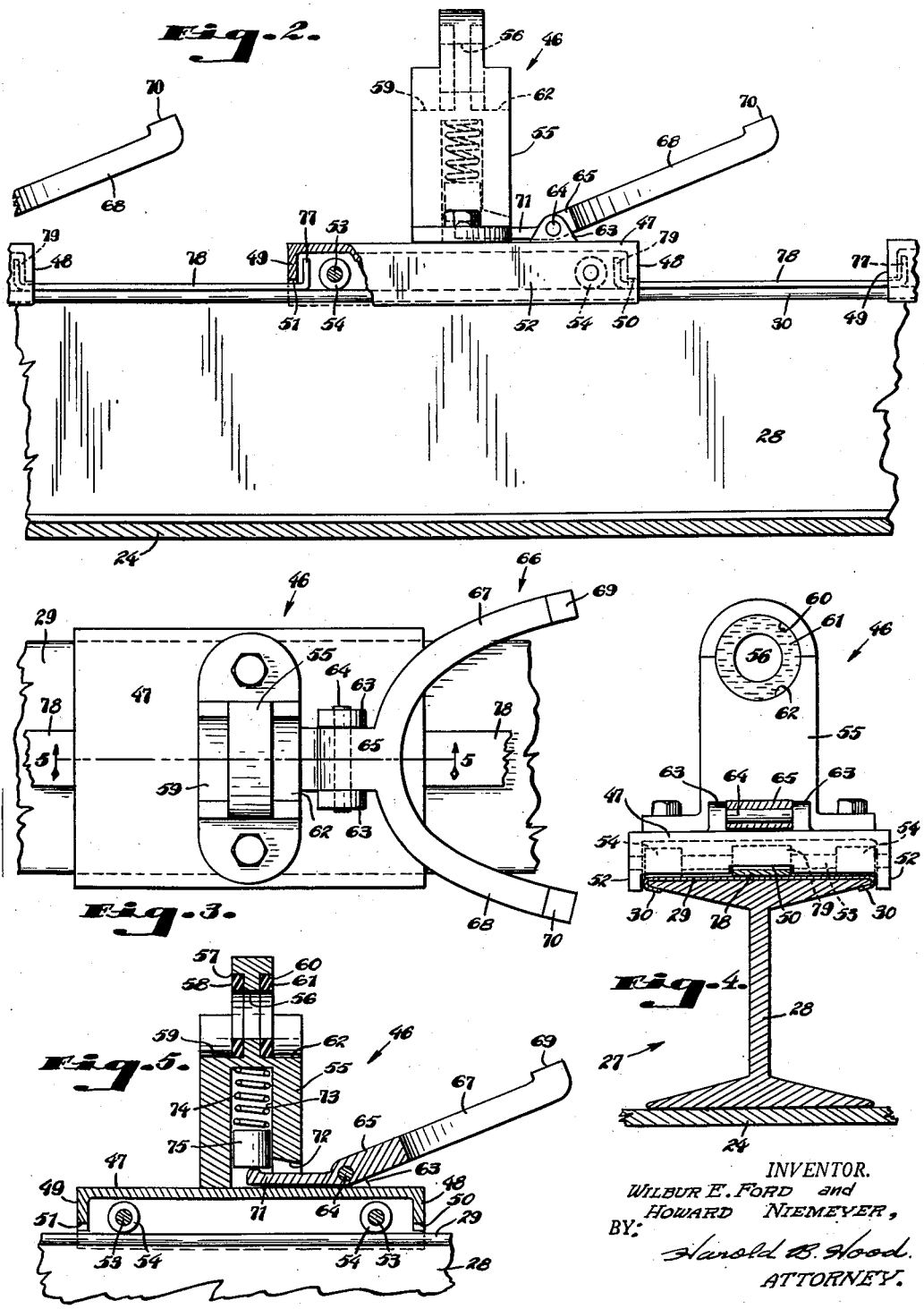

Patented Mar. 17, 1953

2,631,451

UNITED STATES PATENT OFFICE 2,631,451

WATER METER TESTER

Wilbur E. Ford, Wabash, and Howard Niemeyer, Indianapolis, Ind., assignors to The Ford Meter Box Company, Inc., Wabash, Ind., a corporation of Indiana Application May 29, 1950, Serial No. 165,022

14 Claims. (Cl. 73—3)

1

The present invention relates to means for testing fluid meters, and the primary object of the invention is to provide improved means for facilitating the concurrent calibration of a plurality of such meters.

The invention is particularly applicable to the testing of conventional water meters, and it has been illustrated in that environment and will be so described, though it will be apparent, after consideration of the following specification, that the invention as a whole, and many of its features, are adaptable to use in analogous environments wherein devices other than conventional water meters are subjected to tests involving a series flow of fluid through all of a plurality of devices to be tested.

A further object of the invention is to provide a meter testing bench including a trackway interposed between a supply fitting connected to a source of fluid under pressure and a withdrawal fitting, a series of pedestals mounted on said trackway for movement therealong between said fittings, each of said pedestals being formed to provide a supporting saddle for a spud of a conventional meter, the pedestals cooperating to support a plurality of meters in series arrangement and in series communication with each other, to establish a flow path, from said supply fitting through all of said meters to said withdrawal fitting, and means associated with one of the fittings and operating upon that pedestal closest to said one fitting, for moving that pedestal positively toward and away from the other fitting, together with means for limiting the degree of separation of adjacent pedestals. In such an arrangement, as the pedestal directly acted upon by the moving means is shifted toward said other fitting, force is exerted, through the intervening, supported meters, upon all of the other movable pedestals to move them all toward said other fitting, thereby establishing the above-mentioned sealed flow path; and according to the present invention, the separation-limiting means will act upon the series of pedestals, as said one pedestal is moved away from said other fitting, to cause a predetermined degree of separation between each pair of adjacent pedestals, thereby releasing the supported meters for ready removal from the assembly.

A further object of the invention is to provide improved means, in association with such pedestals, for resiliently holding the supported meters against rotation about the axes of their cylindrical spuds which are supported in part-cylindrical, upwardly open saddles on the pedestals.

A further object of the invention is to provide, in association with a test bench, automatic means for shutting off the flow of liquid through the assembled units under test, after a predetermined volume of such liquid has passed through the system.

2

Still further objects of the invention will appear as the description proceeds.

To the accomplishment of the above and related objects, our invention may be embodied in the form illustrated in the accompanying drawings, attention being called to the fact, however, that the drawings are illustrative only, and that change may be made in the specific construction illustrated and described, so long as the scope of the appended claims is not violated.

Fig. 2 is an enlarged, fragmentary side elevation of a portion of the trackway, showing one characteristic intermediate pedestal, and fragments of adjacent pedestals, parts being broken away for clarity of illustration;

Fig. 3 is a further enlarged plan view of one of the pedestals mounted on the trackway;

Fig. 4 is a transverse section through the trackway, showing one of the pedestals in end elevation; and Fig. 5 is a longitudinal, vertical section through one of the pedestals.

Figure 1:
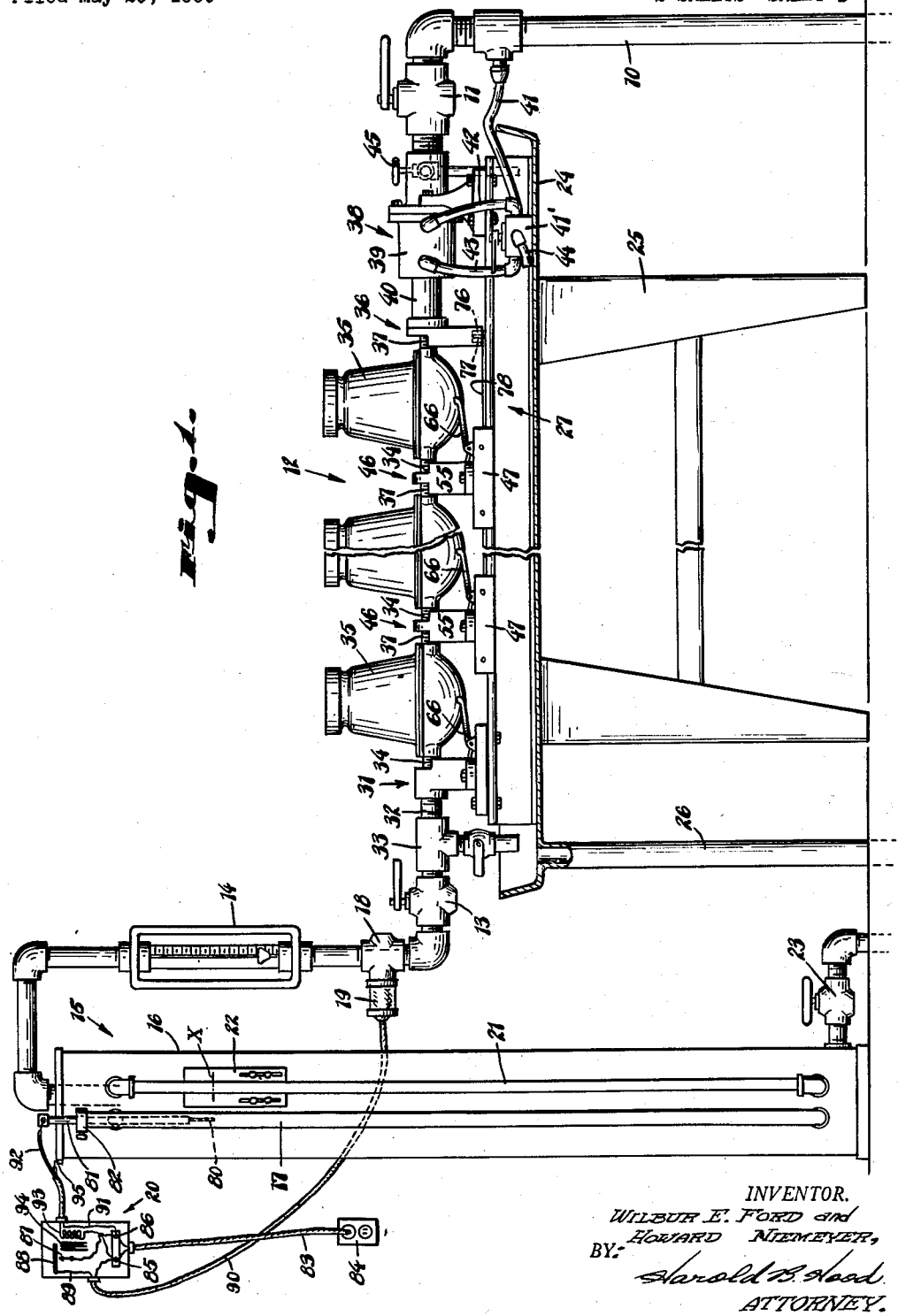
Fig. 1 is a more or less diagrammatic elevational view of a test station embodying the features of our present invention.

In Fig. 1, we have illustrated somewhat diagrammatically a test station incorporating the present invention. In accordance with standard practice, a pipe 10 leads from a source of water under pressure to a supply fitting 11 at one end of a test bench indicated generally by the reference numeral 12. At the opposite end of the bench is provided a withdrawal fitting 13 which leads to a flow rate meter 14 and thence to a calibrated reservoir indicated generally by the reference numeral 15 and comprising a main body 16 with which communicates a stand pipe 17 of much smaller cross-sectional area. The calibration of the reservoir 15, of course, contemplates not only the capacity of the main body 16, but also the capacity of the stand pipe 17 and of the gauge glass 21. In the line between the fitting 13 and the reservoir 15 is connected a cut-off valve 18 with which is associated electric actuating means 19 arranged to be under the domination of a relay or switch mechanism indicated generally by the reference numeral 20. The valve 18 and the actuating means 19 may be of any suitable type; but, in the illustrated embodiment of the invention, the arrangement is such that, upon energization of the actuating means 19, the valve 18 will be closed.

A scale diagrammatically illustrated at 22, is mounted for vertical adjustment upon the outside wall of the reservoir body 16 in close association with the gauge glass 21, so that the level of liquid in the reservoir may be read against the scale 22. In accordance with conventional practice, the scale may carry a single index mark X, to indicate the level of liquid in the reservoir accurately corresponding to the test volume normally used in the operation of the test station;

or, alternatively, the scale 22 may be additionally calibrated above and below the major index mark X. A drain valve 23 controls flow from the reservoir to waste.

The bench 12 comprises a pan 24 which, as shown, may be supported upon a suitable frame 25, and from which leads a waste pipe 26. Fixedly mounted in the pan 24, between the fittings 11 and 13, is a rectilinear track element indicated generally by the reference numeral 27, and illustrated in greatest detail in Fig. 4. Preferably, the track 27 will comprise an ordinary I-beam 28 with whose upper flange is preferably associated a sheath 29 of relatively non-corrodible material such as brass, bronze, copper, or the like, the lateral edges of said sheath being turned about the edges of the upper flange of the I-beam as at 30, and secured thereto in any desired fashion. The advantage of this particular track construction, of course, resides in the fact that it can be formed from standard materials at minimum cost, and yet the trackway is well protected against corrosion resulting from spilled water, and will maintain a smooth operating surface over long periods of use.

Fixed to the trackway adjacent the fitting 13 is a pedestal 31 formed to provide a port therethrough upon an axis lying in the vertical median plane of the trackway 27; and a nipple 32 establishes communication between such port and a valved fitting 33 which may be supported by said nipple and which, in turn, is in communication with the withdrawal fitting 13. The pedestal 31 is formed, at its side opposite the nipple 32, to provide a saddle in which may be supported the outlet spud 34 of a conventional meter 35, the saddle being proportioned and designed to locate such spud in sealing registry with the above-mentioned port through the pedestal. The detailed construction at the upper end of the pedestal 31 is analogous to the construction of the corresponding parts of intermediate pedestals hereinafter to be described in detail.

A pedestal 36 is arranged at the opposite end of the bench to support the inlet spud 37 of another meter 35, said pedestal 36 being provided with a similar saddle which supports such spud 37 in communication with a port through the pedestal 36. The pedestal 36 is secured to move with, and may preferably be supported upon, the reciprocating hollow piston 40 of a fluid motor 38, said piston being guided for reciprocation in the cylinder 39 of said motor. The specific internal construction of the motor 38 forms no part of the present invention, but may preferably correspond to the disclosure of the co-pending application of Wilbur E. Ford, Serial Number 135,489, filed December 28, 1949. Fluid under pressure for operation of the motor 38 may be supplied, from the pipe 10, through a conduit 41 leading to a control valve housing 41′, whence pipes 42 and 43 lead to opposite ends of the cylinder 39. An exhaust pipe 44 communicates with the interior of the housing 41′ and is adapted to discharge into the pan 24. In one position of the valve, the pipe 42 will be placed in communication with the conduit 41 to force the piston 40 toward the left, as viewed in Fig. 1, while the pipe 43 is placed in communication with the exhaust pipe 44. In an opposite position of the valve, the pipe 43 will communicate with the conduit 41 and the pipe 42 will communicate with the pipe 44 to shift the piston 40 toward the right. Preferably, an intermediate position of the valve will close both pipes 42 and 43 against communication with the conduit 41 and the exhaust pipe 44.

Preferably, a pressure-release valve 45 will be connected in the supply line between the fitting 11 and the motor 38. The construction of the motor 38 is such as to provide direct communication between the fitting 11 and the port of the pedestal 36, independent of the motor circuits.

Upon the trackway, and between the pedestals 31 and 36, we mount a plurality of intermediate pedestals 46, for movement along the trackway. The pedestals 46 will be identical, and therefore, only one will be specifically described. Any desired number of such intermediate pedestals may be used, within the limitations of the longitudinal dimension of the bench 12, but we presently prefer to provide eleven such intermediate pedestals, so that twelve meters may be concurrently supported, in series arrangement, upon the bench 12.

Referring to Figs. 2 to 5, it will be seen that each pedestal 46 comprises a generally rectangular, hollow, downwardly open base 47 having downturned end walls or lips 48 and 49 terminating short of the trackway 27, portions 50 and 51 being slightly cut away for a reason which will become apparent. Each base comprises also downturned side walls 52, 52 which engage, or substantially engage, the lateral boundaries of the trackway, as is most clearly illustrated in Fig. 4. Journalled in the side walls 52, adjacent each end wall 48 and 49, is a transversely-extending axle 53 upon which are mounted rollers 54 which support the pedestal for easy movement longitudinally along the trackway 27.

Upstanding from each base 47 is a tower 55 which may be integral with the base or which, as shown, will preferably be separable from, but fixedly secured to, the base. Near its upper end, each tower is formed with a through port 56 located upon an axis including the median vertical plane of the trackway 28. An annular cavity 57 adjacent one end of the port 56 receives a sealing gasket 58; and a part-cylindrical, upwardly open saddle 59, coaxial with the port 56, projects from the corresponding face of the ported portion of the tower toward the fitting 13. Similarly, an annular cavity 60, receiving a sealing washer 61, is located adjacent the opposite end of the port 56, and a corresponding saddle 62 projects therefrom toward the fitting 11. The saddle 59 is adapted to receive and support the inlet spud 37 of a conventional meter 35 in coaxial registry with the port 56, the extremity of said spud being adapted to bear against the washer 58 to provide sealed communication between the spud and the port 56. Similarly, the saddle 62 is adapted to support, in a similar manner, the outlet spud 34 of another conventional meter 35, whereby the inlet spud of said first-named meter is placed in sealed communication with the outlet spud of the second-named meter.

Near the base of the tower 55, and spaced therefrom in the direction of projection of the saddle 62, we provide a pair of upstanding ears 63 in which is supported a journal pin 64 providing a pivotal mounting for a lever 65. The axis of the journal pin 64 is located in a vertical plane perpendicular to the above-mentioned vertical plane including the axis of the port 56. That arm 66 of the lever 65 which projects in the direction of projection of the saddle 62, comprises flaring furcations 67 and 68 which terminate, respectively, in weight-receiving, upwardly facing surfaces 69 and 70. The opposite arm 71 of the lever 65 projects through a slot 72 into the hollow interior 73 of the tower 55, in which a coiled spring 74 is confined between the top wall of the chamber 73 and a plunger 75 reciprocably mounted in said chamber and bearing on the end of the lever arm 71. Thus, the spring 74 tends resiliently to hold the lever 65 in the position in which it is illustrated in Figs. 2 and 5; and clockwise movement of the lever is resiliently resisted by said spring.

Pedestals broadly similar to the pedestal 46 have heretofore been known in the art to which the present invention pertains. When the cylindrical spuds 34 and 37 are dropped into the mutually facing, part-cylindrical saddles of adjacent pedestals, it has been necessary for the operator to hold the meter against turning movement about the axis of its spuds while adjusting the pedestals or the parts thereof to clamp the meter in place. Obviously, the meter should be mounted, for purposes of the test, with its top dial surface in a true horizontal plane, since variations from such a position will render reading of the meters more difficult; and since, furthermore, the accuracy of operation of such a meter may be somewhat deleteriously affected by tilting thereof out of that position.

According to the present invention, such attention on the part of the operator is unnecessary, since the lever 66, spring pressed toward its position illustrated in Figs. 2 and 5, will be turned, by engagement of its surfaces 69 and 70 with the body of a meter, in a clockwise direction against the tendency of its spring 74 when a meter is dropped into the associated pedestal, as is clearly indicated in Fig. 1. The separated arms 67 and 68 of the lever, being located at a common level, at all times, and being equally and oppositely spaced from the vertical plane including the common axis of the spuds 34 and 37, will inevitably hold the associated meter resiliently in proper position with its top dial surface in a horizontal plane.

As is illustrated in Fig. 1, the pedestal 36 is formed with a downwardly-opening cavity 76 therein, such cavity receiving one upturned end 77 of a link 78 whose opposite end 79 (Fig. 2) is located inside the adjacent end wall 48 of the nearest intermediate pedestal 46. Each link 78 comprises a flat strap resting, and solely supported, on the trackway 27 and having its opposite ends upturned, as at 77 and 79. A similar strap 78 has its end 77 located inside the opposite end wall 49 of the same pedestal 46, and its end 79 located inside the adjacent end wall 48 of the next intermediate pedestal 46. All of the intermediate pedestals are thus interconnected into a train; and, if desired, the final intermediate pedestal may be similarly connected to the pedestal 31. As is clearly indicated in Fig. 2, the links 78 provide a lost motion connection throughout the train of pedestals for a purpose which will become clear from the following description of operation.

When a test is to be made, with the valve 11 closed, the meters to be tested are dropped into the saddles of the various pedestals on the bench in the manner generally illustrated in Fig. 1. If a number of meters less than the capacity of the bench is to be tested, a simple pipe section, having a length corresponding to the distance between the oppositely-facing ends of the spuds 34 and 37 of a conventional meter will be inserted between certain pairs of intermediate pedestals 46. Now, the valve 41' will be operated to shift the piston 40 toward the left. The pedestal 36 will thus be moved to clamp the spuds of the directly associated meter between its sealing ring and the sealing ring 61 of the next adjacent pedestal. Pressure exerted through that meter will cause said next adjacent pedestal to move toward the left, and so the whole series of intermediate pedestals will be moved, consecutively closing the distance between them to clamp the supported meters or pipe sections therebetween, until the final meter, whose spud 34 is supported in the pedestal 31, will be sealingly pressed against the washer of the pedestal 31. Thus, there will be established a closed or sealed flow path from the fitting 11 through all of the meters, in series, to the fitting 13. Now, the valve of fitting 11 will be opened and water will be permitted to flow through the system to fill the entire system to the point of discharge into the reservoir 15. Some venting may, if desired, be done through the valved fitting 33.

After completion of the test (which will be described hereinafter) the valve 11 will be closed, and, if desired, the system will be drained through the relief valve 45, after which the valve 41' will be manipulated to retract the piston 40. As the piston starts retractile movement, the upturned end 77 of the associated link 78 will engage the left-hand wall of the cavity 76, whereafter the link 78 will participate in the movement of the piston 40. When its end 79 engages the wall or lip 48 of the adjacent intermediate pedestal base 47, that pedestal will be entrained; and movement will thus be communicated, serially throughout the series of intermediate pedestals to that one nearest the pedestal 31. The links 78 are so proportioned and designed that their upturned ends will engage the cooperating lips of the associated pedestals when the mutually-facing surfaces of the sealing rings 58 and 61 of adjacent pedestals are spaced apart a distance equal to the distance between the ends of the spuds 34 and 37 of a conventional meter, increased by an amount not greater than the longitudinal dimension of one of the saddles 59 and 62. Preferably, the links will be so designed that a clearance of ¼ inch between the meter spuds and the sealing rings 58 and 61 will be provided when the train of pedestals is thus opened.

Obviously, this arrangement permits ready removal of the meters from the pedestal saddles, and ready replacement of a further group of meters to be tested. The meters may be carelessly dropped into the saddles, because of the presence of the spring pressed levers 65; and will be retained in proper relation until the valve 41' is manipulated to close the flow path, as above described.

An accurate test of meters of the character here under consideration requires that an absolutely accurately measured volume of liquid shall be caused to flow therethrough. So far as we are advised, it has always heretofore been necessary for an operator to stand close watch over the test, as the test nears its completion, and to shut off the supply of water precisely at the instant when the level of water in the reservoir 15 reaches the index mark. The test will not be accurate if too little fluid is permitted to flow through the meters; but of course an error in that direction can be corrected by admitting a small additional amount of water to the test system by manipulation of the valve 11. If, however, the slightest excess of water is permitted to flow through the test system, the accuracy of the test is disturbed, and the results thereof must be calculated by interpolation.

It is a major object of our invention, then, to provide automatic means for cutting off the test flow exactly at the optimum instant. Thereby not only do we achieve accuracy of the test and avoid mathematical calculations, but we make it unnecessary for the operator to stand alert guard over the test bench throughout the final period of the test. Instead, he may completely withdraw his attention from the equipment and go on with other work, resting assured that, when the optimum volume of water has passed through the system, flow will be automatically cut off so that he may read the results at his convenience upon his return to the test station.

An electrode 80, carried in a suitable housing 81, is adjustably supported in the open top of the stand pipe 17 by any suitable clamp means, indicated by the reference numeral 82, the extremity of said electrode being located exactly at the level indicated by the index mark X. We prefer to position the electrode 80 in a small-diameter stand pipe, rather than in the main body 16 of the reservoir, in order to avoid inaccuracies incident upon surging or splashing of the liquid in said main body resulting from the incoming flow discharged from the piping system.

An electric cable 83 of conventional construction provides a connection from a current source indicated at 84 to terminal posts 85 and 86 of the relay or switch 20. One terminal 87 of an electrically actuated switch is connected to the post 86, while the other terminal 88 thereof, normally separated from the terminal 87, is connected to one wire 89 of a two-wire cable 90 connected in the energizing circuit of the actuator 19 for the valve 18, the other wire of said cable being electrically connected to the post 85. Thus, an energizing circuit for said actuator is established upon closure of the switch points 87 and 88.

A wire 91 leads from the post 86 to the electrode 80, which is electrically insulated from the body of the stand pipe 17. The stand pipe 17 and the main reservoir body 16 are, of course, made of electrically conductive material; and a wire 95 is electrically connected to the reservoir 15 and leads to one end of a solenoid coil 93, the opposite end of which is connected to the post 85. The core 94 of the solenoid is cooperatively associated with the switch arm 88 so that, upon energization of the coil 93, the arm 88 will be swung into electrical contact with the point 87.

Thus, instantaneously upon attainment of a liquid level in the reservoir 15 corresponding to the index mark X, an energizing circuit for the coil 93 will be established from the current source through the cable 83, post 86, wire 91, wire 92, electrode 80, the body of the water in the reservoir, the reservoir walls, wire 95, coil 93 and post 85; and the switch arm 88 will be swung to close an energizing circuit for the actuator 19 from the current source through the cable 83, post 86, switch point 87, switch arm 88, wire 89, cable 90, actuator 19 and post 85 back to the source. Energization of the actuator 19 will instantaneously close the valve 18 to stop flow through the test assembly.

We claim as our invention:

1. A meter test bench comprising a trackway, a fluid supply fitting at one end of said bench, a fluid withdrawal fitting at the opposite end of said bench, a plurality of pedestals supported on said trackway for movement therealong in alignment with said fittings, said pedestals being formed to provide supporting seats for a plurality of meters to place said meters serially in flow communication with said fittings, that pedestal nearest one of said fittings being fixed relative thereto, means acting on that pedestal nearest the other of said fittings to shift the same toward and away from such fitting, and means providing lost-motion connections between said last-named pedestal and the remaining movable pedestals.

2. A meter test bench comprising a trackway, a fluid supply fitting at one end of said bench, a fluid withdrawal fitting at the opposite end of said bench, means stationarily communicating with one of said fittings and providing a seat to support a meter spud while placing the same in communication with such fitting, a pedestal mounted on said trackway for movement therealong while continuously communicating with the other of said fittings and providing a seat to support a meter spud while placing the same in communication with said other fitting, means for moving said pedestal along said trackway toward and away from said first-named fitting, a plurality of intermediate pedestals mounted on said trackway between said means and said first-named pedestal for movement along said trackway, each of said intermediate pedestals providing a seat facing said means and a seat facing said first-named pedestal, said seats of each intermediate pedestal being adapted to support spuds of separate meters in communication with each other, and means providing lost-motion connections between said pedestals.

3. The bench of claim 2 in which each intermediate pedestal comprises a base supported on rollers resting on said trackway, a tower upstanding from said base, said tower being provided, adjacent its upper end, with a port therethrough whose axis is substantially parallel with the direction of length of said trackway, and a substantially semi-cylindrical, upwardly-opening saddle, coaxial with said port, projecting in each direction from said port.

4. The machine of claim 3 in which each pedestal base includes a lip projecting toward said trackway but spaced therefrom, said lost-motion connection means comprising, between adjacent pedestals, a link having upturned ends engaging the inner surfaces of the lips on said adjacent pedestals.

5. The machine of claim 4 in which each link is supported solely on said trackway with its upturned ends projecting upwardly to a level above that occupied by the lower termini of said pedestal lips.

6. A test bench for conventional fluid meters comprising a trackway, a fluid supply fitting at one end of said bench, a fluid withdrawal fitting at the opposite end of said bench, means stationarily communicating with one of said fittings and providing a seat to support a spud of such a meter while placing the same in communication with such fitting, a pedestal mounted on said trackway for movement therealong while continuously communicating with the other of said fittings and providing a seat to support a spud of such a meter while placing the same in communication with said other fitting, means for moving said pedestal along said trackway, between said fittings, toward and away from said first-named fitting, a plurality of intermediate pedestals mounted on said trackway between said means and said first-named pedestal for movement along said trackway, each of said intermediate pedestals comprising a base supported on said trackway, a tower upstanding from said base and provided, adjacent its upper end, with a port therethrough having a mouth provided with a peripheral sealing seat presented toward said means and a mouth provided with a peripheral sealing seat presented toward said first-named pedestal, a supporting saddle carried by each tower adjacent each of said seats and projecting therefrom in the direction in which its seat faces and adapted to support a spud of such a meter in coactive registry with its seat, each end of the base of each intermediate pedestal, and that end of said first-named pedestal nearer said intermediate pedestals, having a depending lip projecting toward said trackway but spaced therefrom, and a link extending between adjacent pedestals, each link lying on said trackway and having upturned ends coactive with the inner surfaces of the lips on said adjacent pedestals to limit separation of such pedestals, said links, when in engagement with such lips, holding mutually-facing seats of such adjacent pedestals against separation by a dimension exceeding the distance between the remote ends of the two spuds of a conventional meter increased by the length of one of said saddles.

7. In a device of the class described, a trackway, a liquid supply fitting near one end of said trackway, a liquid withdrawal fitting near the other end of said trackway, means stationary with respect to one of said fittings to connect thereto a spud of a conventional meter, a train of pedestals mounted on said trackway for movement therealong, one of said pedestals communicating with the other of said fittings, said pedestals being constructed to support a series of meters and to connect their spuds in series between said fittings, means for shifting said one pedestal toward and away from said one fitting, movement of said one pedestal toward said one fitting acting, through the meters supported on said pedestals, to shift all of said pedestals in the same direction to seal such series connection, and linkage means, inactive during such movement, establishing a lost-motion connection throughout said train of pedestals to separate all of said pedestals during reverse movement of said one pedestal to disestablish such series connection.

8. In a device of the class described, a meter mount comprising an upwardly-opening saddle adapted to receive and support a spud of a conventional fluid meter in registry with a port formed in said mount, means carried by said mount and providing weight-supporting surfaces located beyond the outer end of said saddle and on opposite sides of a vertical plane including the axis of said port, and means resiliently resisting downward movement of said first-named means, said surfaces being disposed in a position to be engaged, and displaced from a position of equilibrium, by such a meter having its spud supported in said saddle.

9. In a device of the class described, a meter mount comprising an upwardly-opening saddle adapted to receive and support a spud of a conventional fluid meter in registry with a port formed in said mount, a yoke pivotally supported on said mount and including separated weight-receiving surfaces, and spring means acting on said yoke to resist downward movement thereof and to hold said surfaces resiliently in a position to be engaged and shifted, against the tendency of said spring means, by such a meter having its spud supported in said saddle.

10. A meter mount comprising a part-cylindrical, upwardly-open saddle adapted to receive loosely and to support a substantially cylindrical spud of a conventional fluid meter in registry with a port formed in said mount, means supported on said mount in position to engage such a meter, when so supported, on opposite sides of a vertical plane including the axis of said saddle, and spring means, acting on said last-named means, to resist turning movement of such a meter about such axis.

11. A meter mount comprising a part-cylindrical, upwardly-open saddle adapted to receive loosely and to support a substantially cylindrical spud of a conventional fluid meter in registry with a port formed in said mount, means supported on said mount in position to engage such a meter, when so supported, on opposite sides of a vertical plane including the axis of said saddle, and spring means acting on said last-named means to exert substantially equal, vertically upward forces against such a meter at the points of engagement of said last-named means with such meter.

12. A meter mount comprising a tower formed to provide, near its upper end, a part-cylindrical, upwardly-open saddle, a lever pivotally supported upon said mount near the base of said tower upon an axis disposed in a plane perpendicular to a plane including the axis of said saddle, said lever being provided with two separated, weight-receiving surfaces located on opposite sides of said last-named plane, and spring means acting on said lever to urge said surfaces upwardly.

13. The mount of claim 12 in which said spring means is housed within said tower.

14. A meter mount comprising a tower having a chamber therein and formed, near its upper end, with a through port, a part-cylindrical, upwardly-opening saddle coaxial with said port and projecting axially away from one end of said port, pivot means carried by said mount adjacent the base of said tower and spaced therefrom beyond the outer end of said saddle, the axis of said pivot means lying in a plane perpendicular to the vertical plane including the common axis of said port and said saddle, a lever mounted, intermediate its ends, on said pivot means for oscillation about the axis thereof, one arm of said lever being provided with two separated, weight-receiving surfaces located on opposite sides of said last-named plane, the other arm of said lever extending into said tower chamber, and a coiled spring housed in said chamber and exerting downward pressure on said last-named arm of said lever.

WILBUR E. FORD.
HOWARD NIEMEYER.

REFERENCES CITED

The following references are of record in the file of this patent:

UNITED STATES PATENTS

| Number | Name | Date |
| --- | --- | --- |
| 1,167,392 | Ford | Jan. 11, 1916 |
| 1,346,898 | Kingsbury | July 20, 1920 |
| 1,434,198 | Calhoun | Oct. 31, 1922 |
| 1,492,205 | Clark | Apr. 29, 1924 |
| 1,934,291 | Baas | Nov. 7, 1933 |
| 2,510,327 | Bennett | June 6, 1950 |